United States Patent [19]

Keller et al.

[11] 4,277,539

[45] Jul. 7, 1981

[54] REFRACTORY ARTICLES AND COMPOSITE METAL-CERAMIC ARTICLES (CERMETS) PREPARED FROM A SILICATE-CONTAINING ALUMINUM TITANATE

[75] Inventors: Hartmut Keller; Axel Krauth; Horst R. Maier; Horst Nink; Hans J. Pohlmann, all of Selb/Bayern; Horst Reddig, Marktredwitz; Johann Siebels, Wolfsburg, all of Fed. Rep. of Germany

[73] Assignee: Rosenthal Technik AG, Fed. Rep. of Germany

[21] Appl. No.: 146,073

[22] Filed: May 2, 1980

Related U.S. Application Data

[63] Continuation of Ser. No. 957,917, Nov. 6, 1978, abandoned.

[30] Foreign Application Priority Data

Nov. 10, 1977 [DE] Fed. Rep. of Germany ....... 2750290

[51] Int. Cl.$^3$ ..................... B32B 15/04; C04B 35/44; C04B 35/46
[52] U.S. Cl. ................................. 428/450; 106/38.27; 106/62; 106/65; 106/67; 106/73.33; 106/7; 106/38.9; 252/455 R; 252/457; 252/454; 266/284
[58] Field of Search ................. 106/73.33, 62, 65, 67; 266/275, 281, 284; 428/450; 106/38.27, 38.9

[56] References Cited

U.S. PATENT DOCUMENTS

| | | | |
|---|---|---|---|
| 2,776,896 | 6/1957 | Harman et al. | 106/73.33 |
| 2,872,726 | 2/1959 | Goliber | 106/65 X |
| 3,534,286 | 10/1970 | Holm et al. | 106/73.33 X |
| 3,607,343 | 9/1971 | Longo et al. | 106/65 X |
| 3,825,653 | 7/1974 | Duerksen et al. | 106/65 X |
| 3,890,140 | 6/1975 | Asbury | 106/73.33 X |
| 4,017,347 | 4/1977 | Cleveland | 106/39.5 X |
| 4,118,240 | 10/1978 | Takabatake | 106/73.33 |

FOREIGN PATENT DOCUMENTS

1238376 4/1967 Fed. Rep. of Germany .

OTHER PUBLICATIONS

Ceramic Industry-Jan. 1967, pp. 72-73, "Binders: Magnesium Aluminum Silicate", Aluminum Titanate.
Nelson, J. S. et al., J. Am. Cer. Soc., Cer. Abstr., 34 (1951) p. 87.
Levin et al.-Phase Diagrams for Ceramists, 1975 Suppli. preb. by J. Am. Cer. Soc. (p. 135), FIG. 4376-System, $Al_2O_3$-$TiI_2$.
Lejus; A. M. et al.-Chimie Minerale-C.R. acad. Sci. Ser. C. 263 (20) 1223 (1966).

Primary Examiner—Helen M. McCarthy
Attorney, Agent, or Firm—Ostrolenk Faber Gerb & Soffen

[57] ABSTRACT

Refractory products such as foundry articles and composite metal-ceramic articles are prepared from a sepiolite (2 $MgO.3SiO_2.2H_2O$) and silicate containing aluminum titanate.

6 Claims, 2 Drawing Figures

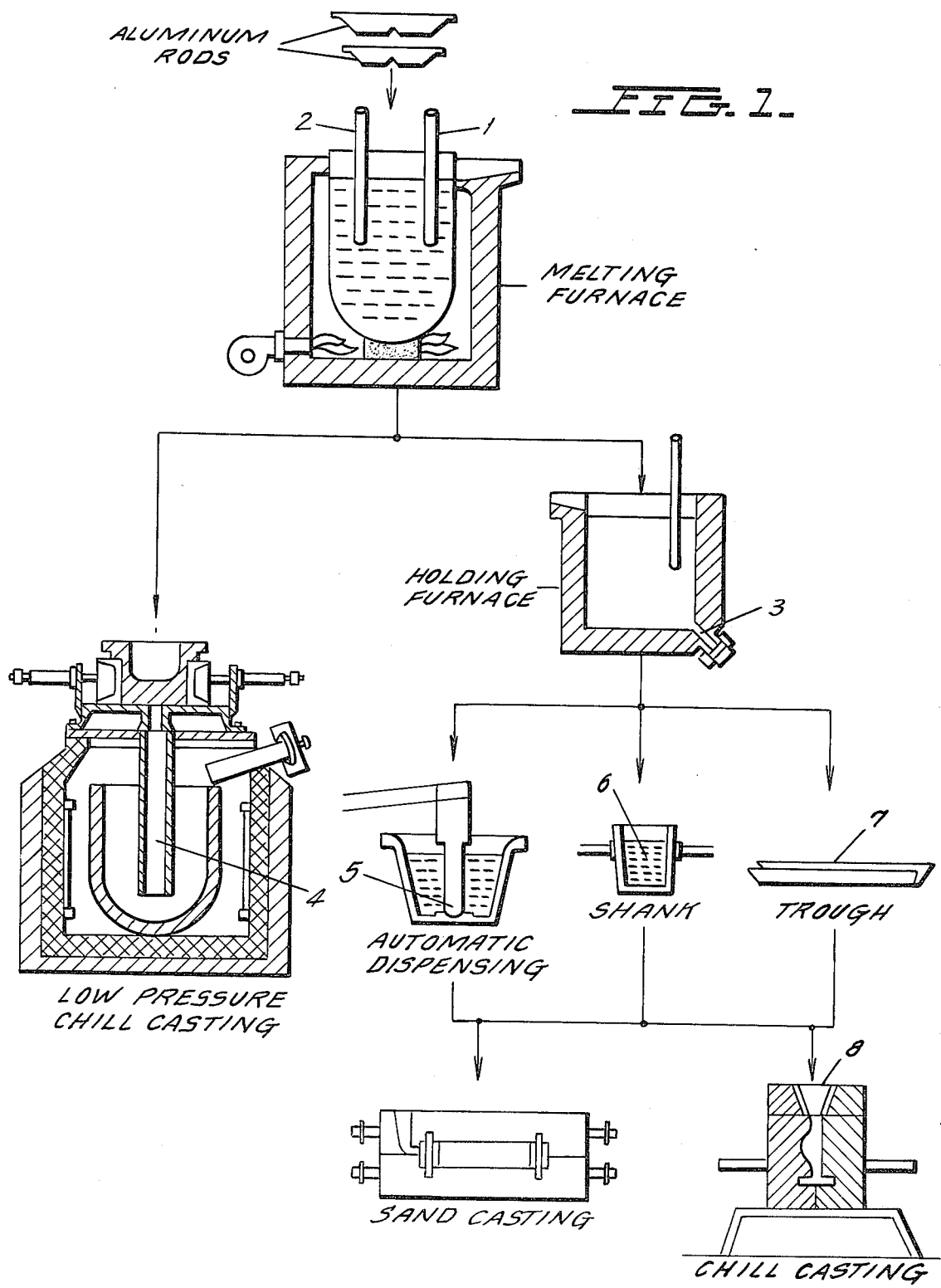

REFRACTORY ARTICLES AND COMPOSITE METAL-CERAMIC ARTICLES (CERMETS) PREPARED FROM A SILICATE-CONTAINING ALUMINUM TITANATE

This is a continuation application of Ser. No. 957,917, filed Nov. 6, 1978, now abandoned.

The invention relates to refractory products, more particularly foundry articles prepared from a silicate-containing aluminum titanate and composite metal-ceramic articles (cermets). Products of this kind are required to have good thermal shock resistance, the ability to withstand corrosion and adequate mechanical strength. It is an object of the invention to obviate the disadvantages of the substances conventionally used, such as corrosion, the poor dimensional stability of asbestos-containing materials and the susceptibility of graphite to oxidation and the short working life of graphite, by the use of a silicate-containing aluminum titanate.

Silicate-containing aluminum titanates of this kind are known from German Auslegeschrift No. 1,238,376, which discloses the outstanding thermal shock resistance and reduced heat expansion of these compositions. Compositions of this kind are compatible with plastic ingredients in the form of kaolinite, as is disclosed more particularly by Example 2 wherein 7.1 parts by weight of kaolinite, 53.3 parts by weight of aluminum oxide and 39.6 parts by weight of titanium oxide are mixed and prepared and sintered at a firing temperature of 1530° C. The resulting material has an average coefficient of expansion of $+0.9 \times 10^{-6}/°$C. up to 1000° C. U.S. Pat. No. 2,776,896 discloses a silicate-containing aluminum titanate having iron titanate and deals in particular with the poor mechanical strength of the aluminum titanate. Additions of from 5 to 40 weight % of clay or kaolinite or from 1 to 10 weight % of talc are considered to increase the strength without appreciably reducing the low coefficient of expansion of the substance.

German Pat. No. 1,915,780 discloses, for use for refractory products and similar fields, a zirconium-containing aluminum titanate having a crushing strength of about 1.1–3.3 $(g/mm^2)$. The addition of zirconium silicate is between 5 and 30 weight %.

Experiments with these compositions have shown that, more particularly in the preparation and processing of non-ferrous (NE) metals, the substances thus disclosed have lives which are too short for them to be economic in practical use. They proved to be unreliable refractory products, more particularly in the rough conditions prevailing in foundry and melting work.

Also, German Auslegeschrifts No. 2,163,717 and 2,354,254 disclose cermets, more particularly exhaust ducts inside cylinder heads. The cermets have a double-walled structure, one part being of metal, e.g. aluminum, while the other part is ceramic. Because of the heat insulation provided by the ceramic, articles of this kind are suitable more particularly for exhaust pipes, exhaust lines and exhaust elbows of combustion engines. A very wide variety of ceramic materials are mentioned as heat-resistant materials, however, it has been found in practice that when the metal freezes, compressive forces of such strength are produced that the nonmetallic substances crack readily. It is therefore another object of this invention to use a ceramic material enabling a good combination with adequate strength to be achieved between the metal and ceramic.

The prior art shows that aritsans have shown a keen interest in aluminum titanate since the 50's but it has not yet made an industrial breakthrough because its strength properties are unsatisfactory. The strength coefficients of aluminum titanate as compared with e.g. aluminum oxide, silicon nitride and zirconium oxide are relatively low: hence the long-lasting conviction that aluminum titanate was unsuitable for industrial use. The invention therefore follows a new route such that the bad and good properties are so combined, in association with a product design suitable for the operation of the product, that new possibilities are opened up for the practical use of this material.

The common denominator of all the problems concerning the use of aluminum titanate is the desire so to limit the thermal and mechanical properties of silicate-containing aluminum titanate that new areas of use can be found for it, more particularly in the rough conditions of foundry and melting work in connection with NE metals, where the refractoriness, thermal shock resistance, good heat insulation and reliability of the material are important factors. Another requirement is to discover an aluminum titanate of high mechanical strength in order to produce a cermet of high impact strength.

The invention involves the use of silicate-containing aluminum titanate of raw ingredients having a grain size of below 0.6 $\mu$m and a chemical composition of from 50 to 60 weight % $Al_2O_3$, 40 to 45 weight % $TiO_2$, 2 to 5 weight % kaolinite and 0.1 to 1 weight % magnesium silicate, as a material for the preparation of articles have a thermal shock coefficient R of 130 to 180 (W/cm), a heat insulator factor $\lambda$ of 0.01 to 0.03 (W/cm K), a coefficient of expansion Ak of $\pm 0.5 \times 10^{-6}/°$C., an elasticity modulus of approximately $1.4 \times 10^3$ $(g/mm^2)$ and a transverse strength dB of 40 $(N/mm^2)$ and a crushing strength $\delta$D of about 77 $(g/mm^2)$, the articles also being non-wettable in respect to most NE metals and being alkali-resistant.

An advantageous feature of the invention is to use the material for the preparation of refractory products, more particularly foundry articles such as thermocouple pockets, gas inlet pipes, closure plugs with plate, risers, valve plugs, shanks, linings for castings and riser inserts.

Another use of the material according to the invention is in the preparation of ceramic firing adjuvants, more particularly for trays in rapid firing.

A preferred use of the material according to the invention is in the preparation of cermets, more particularly exhaust ducts in cylinder heads and exhaust manifolds.

BRIEF DESCRIPTION OF THE DRAWING

The invention will be described in greater detail with reference to embodiments shown diagrammatically in the drawings wherein:

FIG. 1 shows ceramic components in aluminum processing, and

Figure 2A:
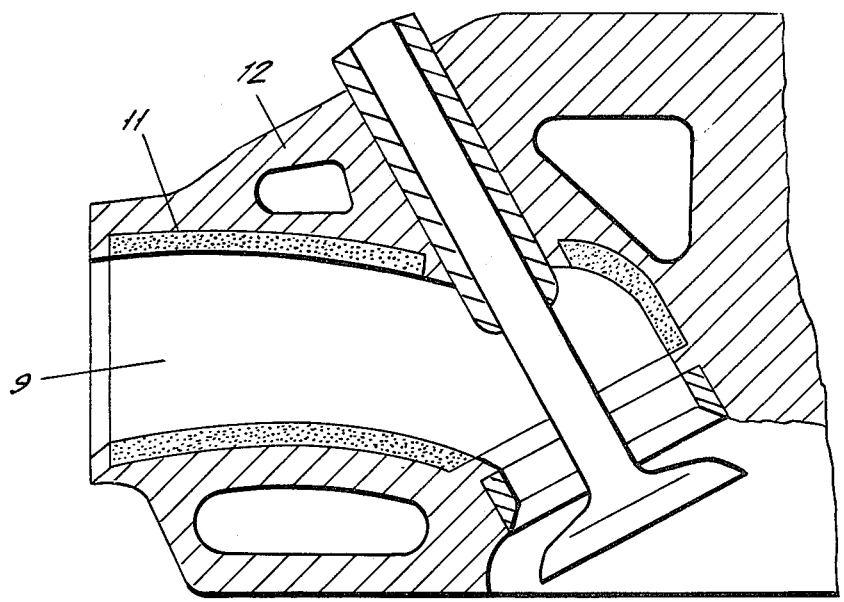
FIGS. 2a and 2b show cermet articles in the motor vehicle industry.

Aluminum titanate has unusual properties; for instance, it may have a negative coefficient of expansion. Its properties are mainly determined by the various additions to the mix of aluminum titanate, by different heat treatments, by firing and by the method of preparation; it is impossible to give simple rules for the preparation of refractory products and cermets and the best solution must be found for each individual case. Basically, however, it can be said that the thermal shock resistance is lower in proportion as mechanical strength is higher. The properties of the material must be matched accurately to the technical requirements arising in new applications. To this end, the raw ingredients for the substance according to the invention are from 40 to 60 weight % of reactive alumina and from 40 to 45 weight % titanium oxide, both the ingredients having an average grain size of less than 0.6 μm. From 2 to 5 weight % kaolinite and from 0.1 to 1 weight % of magnesium silicate are then added. These batches are then ground in ball mills for about 12 hours and plasticized by means of organic bonding agents such as e.g. 1 weight % triglycerol and 2 weight % polyvinyl alcohol; the solids-water relationship and the choice of dispersants have a considerable effect on the viscosity of the slip. For foundry articles, potsherds of aluminum titanate which has been calcined at from 700° to 1000° C. can be added to the slip; however, these ingredients must have different grain sizes. The specimens, measuring $5 \times 5 \times 50$ mm, are dried, then fired at from 1350° to 1450° C. with a dwell time of approximately 2 hours, the warming-up rate being between 50° and 150° K./h, depending upon the size and dimension of the products. The resulting properties of the material according to the invention can be gathered from the following Table:

Thermal shock coefficient $R = 130$ to $180$ (W/cm$^2$)
Heat insulation coefficient $\lambda = 0.01$ to $0.03$ (W/cm K)
Coefficient of expansion $AK = \pm 0.5 \times 10^{-6}/°C$.
Modulus of elasticity Approx. $1.4 \times 10^3$ (g/mm$^2$)
Transverse strength $\delta B = $ about 4.4 (g/mm$^2$)
Crushing strength $\delta D = $ about 77 (g/mm$^2$)

The material was also found not to be readily wettable in respect of most non-metals and to be alkali-resistant. The figure of from 14 to 18% for average shrinkage was calculated from the experimental data. The density of the sintered ceramic article is approximately 3.1–3.3 g/cm$^3$.

Insulating articles can be produced by the known ceramic processes. However, it is, in individual cases, a good idea to use casting for the production of articles which have complicated shapes and tubes which do not have to withstand very severe mechanical stresses; articles of this kind include thermocouple pockets 1 and riser inserts 8 and they are shown diagrammatically in FIG. 1.

The material according to the invention is also of use in the preparation of foundry articles, such as gas inlet tubes 2, closure plugs with plate 3, risers 4, valve plugs 5, shanks 6 and linings 7 for casting. For this purpose, because of the relatively heavy mechanical stressing of the products, use is made more particularly of sprayed-on granular material which is either pressed or compacted isostatically at a pressure above 300° bar. The isostatic blanks are treated by turning or cutting to transform them to the appropriate finished articles. Risers 4 varying in length from 500 to 1200 mm and having a variety of new kinds of connection have already been used successfully. Much longer and complex inserts have been used in closure systems 3 for automatic dispensers and holding furnaces. It has been found possible to use these materials successfully not only in the aluminum industry but also as components in zinc processing. Basically, articles of this kind made of the material according to the invention do not crack upon sudden contact with liquid NE metals; it is interesting to note that the relatively poor strength of the aluminum titanate is more than offset by its reduced heat expansion and good thermal stressing properties. A special reason for the present use is that a material of this kind has no wettability in respect of liquid NE metals, while its poor heat conductivity is advantageous, more particularly in the case of the riser inserts 8. The possibility of using this material for foundry articles must therefore be regarded as surprising.

Ceramic firing adjuvants for domestic ceramic wave, more particularly for trays in rapid firing kilns, can also be prepared from the silicate-containing aluminum titanate according to the invention. Shaping can be either by casting or dry pressing or tamping. The working life of the trays can be improved considerably by an introduction into the mix of coarse constituents of various grain sizes. For instance, a sprayed-on granular material having grain sizes between 40 and 200 μm is used for dry pressing. More particularly for the preparation of firing trays, aluminum oxide can be added to the mix to further improve stability.

Figure 2B:
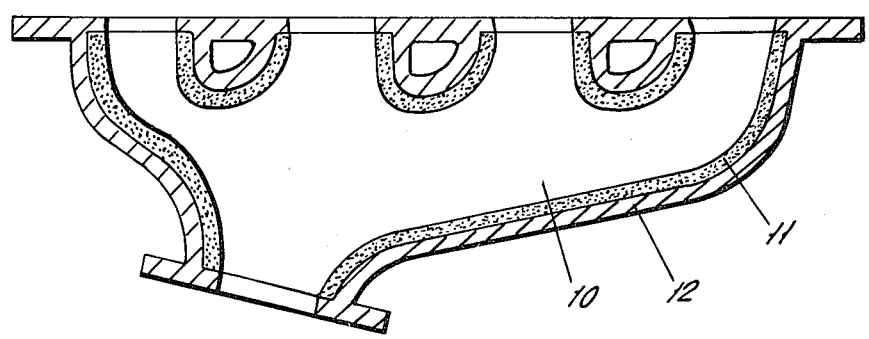

An important use for the material according to the invention is the preparation of a cermet which, because of the heat insulation it provides and because of the heat stresses arising, is particularly suitable for exhaust lines, exhaust pipes and exhaust elbows of combustion engines. As can be gathered from FIGS. 2a and 2b, these items have very complicated shapes and so virtually the only process used is ceramic casting. First, a plaster model is prepared and the slip cast into it. After a wall thickness of from approximately 2 to 3 mm has been formed on the plaster cast, the rest of the slip is poured out and the moulding removed from the model. The resulting moulding is sintered at 1400° C. The sintered article can be dipped in liquid aluminum without preheating or given the known casting treatment of being placed in a casting mould into which molten aluminum is poured. To close passages and orifices during casting, the moulding can be filled with silica sand with an addition of bonding agents. Surprisingly, the aluminum titanate according to the invention accepts the severe compressive stresses of the cooling contracting aluminum melt, assuming that the mould has been properly constructed from the ceramic point of view. It is therefore possible to produce a ceramic lined heat-insulating metal tube 12 which is of a complicated shape and has thin ceramic walls 11, as can be seen in the case of the exhaust duct in a cylinder head 9 in FIG. 2a and in the case of an exhaust manifold 10 in FIG. 2b.

The cermets described have no disadvantages. They provide outstandingly good heat insulation and have excellent impact and vibration strengths. They are also suitable for the application of the after burning of the exhaust from the motor-cars by putting on a catalyst to the surface of the ceramic body.

This invention provides advantages over conventional refractory materials such as graphite, asbestos, cast iron and SiC. The invention provides improved stability and a longer working life, more particularly in the case of foundry articles, a factor of great significance since it reduces costs considerably. The articles, in addition to having good thermal shock resistance, can be used in an oxidizing and reducing atmosphere. The functions of the material were found to be unaffected by erosion and chemical attack. In addition to the fact that the novel material has further uses than the known products based on aluminum titanate, the material has other technological and economic advantages in that it is relatively cheap to produce, requiring neither costly hot pressing nor other expensive processes.

In connection with exhaust gas conductors ("portliners") the following batch composition should be mentioned:

53.4% by weight $Al_2O_3$
42.8% by weight $TiO_2$
3.4% by weight Kaolin
0.4% by weight sepiolite the particle size of the initial raw materials being less than 1 μm. As a result of the finely granular nature of the raw materials, the firing temperature can also be lowered to 1350° C. The fired material then has a modulus of elasticity of about $3.5 \ 10^{-3}$ (g/mm²), a flexural strength $\delta B$ of about 5.7 (g/mm²) and a compressive strength $\delta D$ of about 93.5 (g/mm²). A further possible method of increasing the reliability of such a composite body resides in an after-treatment of the ceramic body.

What is claimed is:

1. An article having a thermal shock coefficient R of 130 to 180 (W/cm), a heat insulation factor λ of 0.01 to 0.03 (W/cm K), a coefficient of expansion AK of $\pm 0.5 \times 10^{-6}$/°C., an elasticity modulus of approximately $1.4 \times 10^3$ (g/mm²) and a transverse strength $\delta_B$ of about 4.4 (g/mm²) and a crushing strength $\delta_D$ of about 77 (g/mm²), the article being non-wettable in respect to most NE metals and being alkali-resistant prepared from a silicate-containing aluminum titanate of raw ingredients having a grain size of below 0.6 μm and a chemical composition consisting essentially of from 50 to 60 weight % $Al_2O_3$, 40 to 45 weight % $TiO_2$, 2 to 5 weight % kaolinite and 0.1 to 1 weight % sepiolite.

2. The article according to claim 1 in the form of thermocouple pocket, gas inlet pipe, closure plug with plate, riser, valve plug, shank, lining for casting or riser inserts.

3. A composite metal-ceramic article in which the ceramic portion is according to claim 1.

4. An article having a thermal shock coefficient R of 130 to 180 (W/cm), a heat insulation factor λ of 0.01 to 0.03 (W/cm), a coefficient of expansion AK of $\pm 0.5 \times 10^{-6}$/°C., an elasticity modulus of approximately $3.5 \times 10^3$ (g/mm²) and a transverse strength $\delta_B$ of about 5.7 (g/mm²) and a crushing strength $\delta_D$ of about 93.5 (g/mm²), the article being non-wettable in respect of most NE metals and being alkali-resistant prepared from a silicate-containing aluminum titanate of raw ingredients having a grain size of below 0.6 μm and a chemical composition consisting essentially of 53.4 weight % $Al_2O_3$, 42.8 weight % $TiO_2$, 3.4 weight % kaolin and 0.4 weight % sepiolite.

5. In the process of preparing a refractory ceramic article which employs an aluminum titanate, the improvement which comprises employing a silicate-containing aluminum titanate of raw ingredients having a grain size of below 0.6 μm and a chemical composition consisting essentially of from 50 to 60 weight % $Al_2O_3$, 40 to 45 weight % $TiO_2$, 2 to 5 weight % kaolinite and 0.1 to 1 weight % sepiolite.

6. The method of claim 5 wherein said composition is 53.4% $Al_2O_3$, 42.8% $TiO_2$, 3.4% kaolin and 0.4% sepiolite.

* * * * *

UNITED STATES PATENT AND TRADEMARK OFFICE
CERTIFICATE OF CORRECTION

PATENT NO. : 4,277,539

DATED : July 7, 1981

INVENTOR(S) : Hartmut Keller et al

It is certified that error appears in the above-identified patent and that said Letters Patent are hereby corrected as shown below:

On the Title Page, Item [73] should read:
-- Rosenthal Technik AG, Fed. Rep. of Germany and Volkswagenwerk AG, Fed. Rep. of Germany. --

Signed and Sealed this

First Day of December 1981

[SEAL]

*Attest:*

GERALD J. MOSSINGHOFF

*Attesting Officer*  *Commissioner of Patents and Trademarks*